United States Patent [19]

Drost et al.

[11] Patent Number: 6,055,269
[45] Date of Patent: Apr. 25, 2000

[54] ADAPTIVE EQUALIZATION TECHNIQUE USING TWICE SAMPLED NON-RETURN TO ZERO DATA

[75] Inventors: Robert J. Drost, Palo Alto; Robert Bosnyak, San Jose; Jose M. Cruz, Palo Alto, all of Calif.

[73] Assignee: Sun Microsystems, Inc., Palo Alto, Calif.

[21] Appl. No.: 08/944,599

[22] Filed: Oct. 6, 1997

[51] Int. Cl.$^7$ .......................... H03K 5/159; H03G 11/04; H03H 5/00

[52] U.S. Cl. ............................ 375/232; 375/233; 333/18; 333/28

[58] Field of Search .................................. 375/229, 230, 375/231, 232, 233; 333/18, 28

[56] References Cited

U.S. PATENT DOCUMENTS

| | | | |
|---|---|---|---|
| 5,132,926 | 7/1992 | MacEachern et al. | 375/232 |
| 5,604,741 | 2/1997 | Samueli et al. | 375/231 |
| 5,692,020 | 11/1997 | Robbins | 375/350 |

OTHER PUBLICATIONS

M. Simon, et al., "Digital Commmunication Techniques, Signal Design and Detection," Prentice Hall, 1995, pp. 600–613.

D. A. Johns, D. Essig, "Integrated Circuits for Data Transmission Over Twisted–Pair Channels," IEEE J. Solid–State Circuits, vol. 21, Mar. 1997, pp. 398–406.

Joshua C. Park, et al., "High–Speed Continuous–Time Analog Complex Graphic Equalizer for Magnetic Recording Read Channels," IEEE 1997 Custom Integrated Circuits Conference, pp. 5–8.

James S. Ignowski, et al., "A CMOS Analog Adaptive Equalizer for a DDS3 Tape Drive PRML Read Channel," IEEE 1997 Custom Integrated Circuits Conference, pp. 9–12.

J. Routama, et al., "A Transmitter and Receiver Interface Circuit Including an Equalizer and PFLL for 150Mbit/s Cable Communication," IEEE 1997 Custom Integrated Circuits Conference, pp. 315–318.

*Primary Examiner*—Stephen Chin
*Assistant Examiner*—Albert Park
*Attorney, Agent, or Firm*—Hecker & Harriman

[57] ABSTRACT

A method and apparatus for providing equalization for a communication channel is provided. The invention uses edge transition samples, such as those obtained for phase detection in a phase locked loop (PLL) circuit, to determine the amount of equalization to be applied to signals received from a communication channel. By monitoring run lengths of consecutive identical bits received from the communication channel, the invention provides equalization for various frequency components present in the receive signal. One embodiment of the invention subtracts a weighted RC-filtered version of the receive signal from the unfiltered receive signal to provide an equalized receive signal. In this embodiment, a control circuit that monitors the received run lengths and edge transition information adjusts the resistance of the RC filter to adapt the equalization to the data being received and the potentially time varying conditions for the communication channel. Other embodiments of the invention use an analog finite impulse response filter, digital finite impulse response filter, analog decision feedback equalizer, digital decision feedback equalizer, analog forward feedback equalizer, or digital forward feedback equalizer to provide equalization based on the same information.

53 Claims, 10 Drawing Sheets

6,055,269

ADAPTIVE EQUALIZATION TECHNIQUE USING TWICE SAMPLED NON-RETURN TO ZERO DATA

BACKGROUND OF THE INVENTION

1. Field of the Invention

The invention relates generally to an equalization technique for data communication, and more particularly to an adaptive equalization technique using twice sampled non-return to zero (NRZ) data.

2. Background Art

In data communication, often the channel through which information is being sent limits the achievable bandwidth, or rate at which information may pass through the channel. One significant limitation that a channel can introduce is inter-symbol interference (ISI). ISI occurs when a portion of a signal representative of one bit of information interferes with a different portion of the signal representative of a different bit of information. Normally, the portions of the signal representative of different bits occur at different times. However, the limited bandwidth of a medium used to provide the channel may cause a NRZ pulse sent by a transmitter to be smeared out over multiple bit periods before it reaches a receiver.

Besides attenuating the maximum energy contained in any one bit period, the smeared pulses interfere with adjacent bits. Since adjacent bits are not correlated (or are only loosely correlated), the interfering information greatly raises the effective noise power and thus reduces the signal to noise ratio. In metallic wiring used for communication (such as the popular CAT-5 twisted pair cables used for ethernet, or printed circuit board microstrip traces used to interconnect chips on a board) a typical cause of ISI is a combination of frequency dependent attenuation and group delay. These frequency dependent properties are a result of skin-effect increase in resistance and frequency dependent insulator losses. If the attenuation in the channel varies by 6 dB or more over the range of frequencies contained in the transmitted signal, then, for some bit periods, the noise will even become greater in amplitude than the bit being sent, making it impossible to receive the bit without some form of equalization.

Equalization involves altering a signal so that it may be more easily received. A signal may be altered at the transmitter so that the influence of the channel on the signal will yield a signal capable of being properly recognized and received at the receiver. However, transmitter-based equalization is difficult since the transmitter must have a priori knowledge of the characteristics of the transmission channel and any changes that may occur to the characteristics of the transmission channel over time.

Equalization may also be performed at the receiver. Receiver-based equalization can use properties of the receive signal to adjust equalization parameters. However, receiver-based equalization becomes difficult if the signal is greatly distorted. As a result, receiver-based equalization has typically been applied only to relatively low bandwidth communication systems.

Adaptive equalization attempts apply a correct amount of equalization to the channel. However, determining the optimum equalization parameters may be prohibitively expensive or difficult. For example, while measurement of signal power is a simple technique to perform, signal power provides only an average of the attenuation from multiple frequencies. This averaging oversimplifies the problem, thereby limiting the accuracy of this technique. Moreover, this technique also requires a priori knowledge of the transmitted power which may not be possible to know (for example, a fiber channel allows for a range of transmit powers). Adaptive equalization may also introduce temporal inaccuracies if it is not continually adapted. For instance, a scheme where the adapting is performed only initially, or periodically, misses the temporal changes (for instance, those caused by humidity, power supply, or temperature changes) that may affect the amount of equalization needed at other times.

SUMMARY OF THE INVENTION

The invention provides a method and apparatus for providing equalization for a communication channel. The invention avoids the complexity and additional components required by prior art equalization techniques. By avoiding such complexity, the invention supports high data rates.

The invention uses edge transition samples, such as those obtained for phase detection in a phase locked loop (PLL) circuit, to determine the amount of equalization to be applied to signals received from a communication channel. By monitoring run lengths of consecutive identical bits received from the communication channel, the invention provides equalization for various frequency components present in the receive signal. Since attenuation occurring in a communication channel is usually a strong function of frequency, the invention allows much more accurate equalization than prior art techniques.

One embodiment of the invention subtracts a weighted RC-filtered version of the receive signal from the unfiltered receive signal to provide an equalized receive signal. In this embodiment, a control circuit that monitors the received run lengths and edge transition information adjusts the resistance of the RC filter to adapt the equalization to the data being received and the potentially time varying conditions for the communication channel.

Other embodiments of the invention use an analog finite impulse response filter, digital finite impulse response filter, analog decision feedback equalizer, digital decision feedback equalizer, analog forward feedback equalizer, or digital forward feedback equalizer to provide equalization based on the same information.

DETAILED DESCRIPTION OF THE INVENTION

Figure 1:
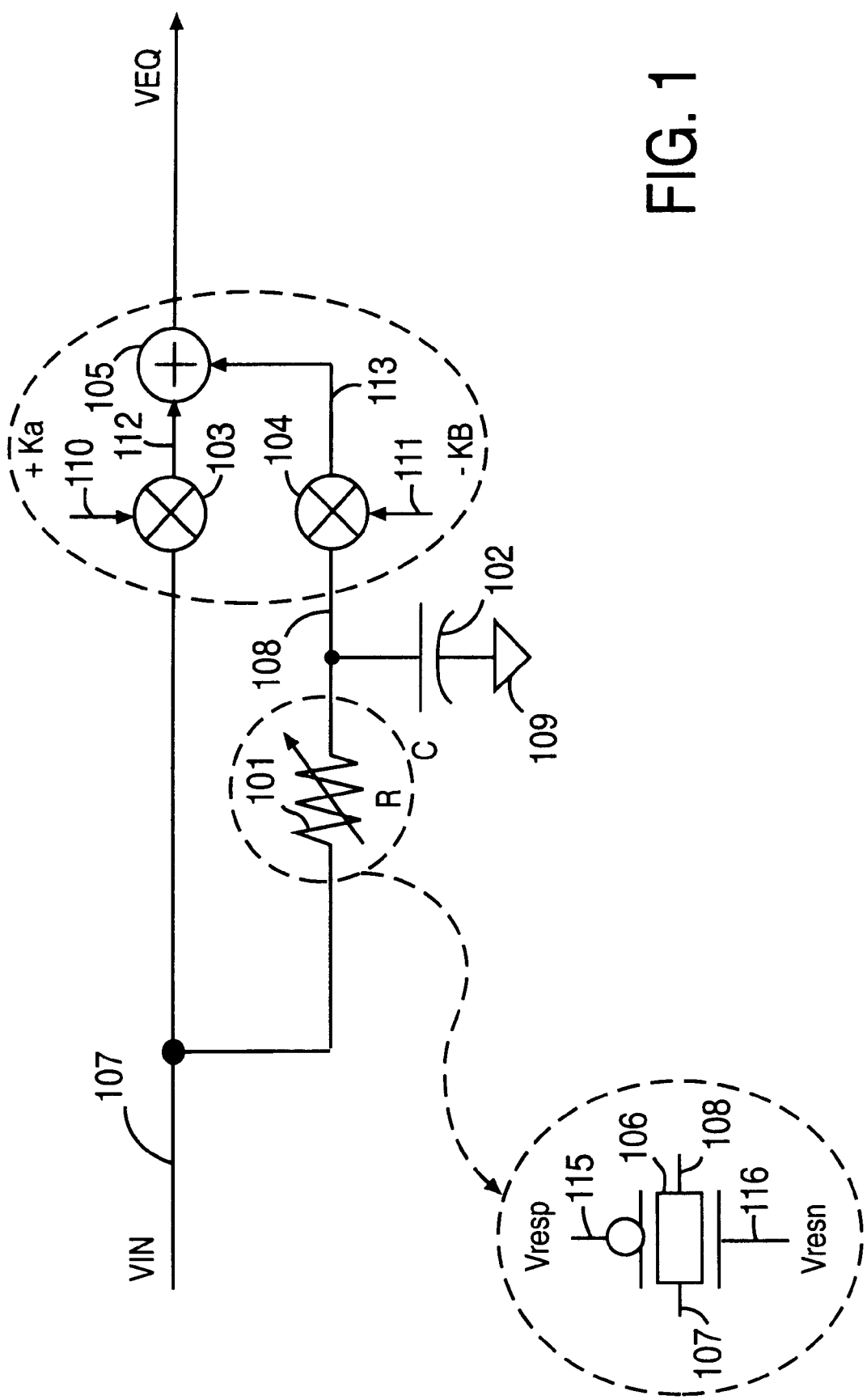
FIG. 1 is a block diagram illustrating an RC-based equalizer according to one embodiment of the invention.

The invention provides a method and apparatus for providing equalization for a communication channel. In the following description, numerous specific details are set forth in order to provide a more thorough understanding of the present invention. It will be apparent, however, to one skilled in the art, that the present invention may be practiced without these specific details. In other instances, well-known features have not been described in detail in order not to unnecessarily obscure the present invention.

In the past, fixed equalization systems were unable to adapt to changing conditions in a communication channel. Attempts at adaptive equalization have typically introduced additional components and complexity that reduce the achievable bandwidth to unacceptable levels. Equalization has been attempted by checking the power level of the receive signal. However, the power level is not meaningful unless the power level at which the signal was transmitted is also known. Moreover, checking the power level does not allow equalization of particular spectral components of the receive signal.

The invention provides equalization adaptively in the particular amount required by the channel. The adaptive control introduces no additional requirements on the front end of the receiver (which may be, for example, sense amplifiers that perform a one-bit analog-to-digital conversion). Thus, the speed of the receiver at the front end is not compromised. Furthermore, the adaptive control is more sophisticated than a simple power level check. The adaptive control adjusts the relative attenuation levels at different frequencies, thereby both removing the need to know the transmitted power level and the unwanted effect of averaging the attenuation at all frequencies that results from the use of a simple power level check.

The adaptive control can be run at start up on a known initialization pattern to get a first "lock" to the channel's properties and then can be run continuously while data are being sent, thereby removing the need for periodic calibrations, and the inaccuracies of time periods where the channel's properties may shift and not be tracked.

In order to provide clock recovery on serial links, it is common to sample each bit twice. One sample is taken at the bit's center to recover the data, and another sample is taken at the bit's transition to detect if the recovered clock is fast or slow relative to the data's transition edge. Normally, the recovered data bits are passed on to higher levels of the communication stack, while the transition samples are only used for the clock recovery phase lock loop.

In the adaptive equalization method of the present invention, the transition samples are passed along with the data samples to the adaptive equalization control. The control consists of looking for specific patterns of data and the following transition to see if a systemic phase offset is being caused by inter-symbol interference.

For instance, in the 8B10B run-length limited data encoding that is currently being used in fiber channel and gigabit ethernet, the data is encoded so that the maximum number of consecutive zeros or ones is five. For this encoding, the adaptive equalization control determine whether transitions following runs of two, three, four, or five bits are typically late or early.

For instance, if the transition after runs of five bits is typically late, that would indicate that more attenuation is needed for low frequency components. If the transition is typically early, that would indicate less low frequency attenuation is needed. By looking at transitions after sequences of shorter runs of data, we can also determine if we need to apply more or less attenuation at the higher frequencies represented by the shorter bit run lengths.

In the implemented adaptive equalization system, the adaptive control affects an analog resistor capacitor subtracting low pass filter to implement the attenuation of lower frequencies in order to maintain the characteristics of the channel. In other embodiments, the equalization could be performed digitally, for instance by a digital finite impulse response filter, or a decision feedback or feedforward equalizer, or analog versions of those. For any of those equalization techniques,. the adaptive control can determine the parameters of the equalization needed to compensate for the channel attenuation.

In one embodiment of the invention, an analog equalizer is provided to boost the high frequency components of a signal so as to restore high frequency components of a signal that may have been attenuated by the channel or in some other manner (for instance, by RC attenuation resulting from package or printed circuit board (PCB) parasitics).

FIG. 1 is a block diagram illustrating an RC-based equalizer according to one embodiment of the invention. The equalizer comprises variable resistance element 101, capacitor 102, gain control 103, gain control 104, and summer 105. Input Vin 107 is coupled to a first input of gain control 103 and to a first terminal of variable resistance element 101. A second terminal of variable resistance element 101 is coupled to a first terminal of capacitor 102 and to a first input of gain control 104 at node 108. A second terminal of capacitor 102 is coupled to ground 109. Input+Ka is provided at a second input of gain control 103. Input−Kb is provided at a second input of gain control 104. The output of gain control 103 is coupled to a first input of summer 105. The output of gain control 104 is coupled to a second input of summer 105. The output of summer 105 provides output Veq at node 114.

CMOS transmission gate 106 may be used to implement variable resistance element 101. A first control signal of a first polarity is provided by a control circuit to input Vresp, which is coupled to PMOS gate terminal 115. A second control signal of a second polarity is provided by a control circuit to input Vresn, which is coupled to NMOS gate terminal 116.

The analog equalizer implements an RC filter that tracks an exponential weighted average of the input signal with a time constant that is adjust by varying the filter's resistance. In one embodiment of the analog equalizer, the smallest values of resistance that are used are above 500 ohms so that the added loading perturbs the termination impedance by no more than 10 percent. Capacitor 102 in one embodiment can be the wiring and transistor parasitics associated with the input circuits of the receiver (i.e., an explicit capacitor may not need to be added).

Figure 4:
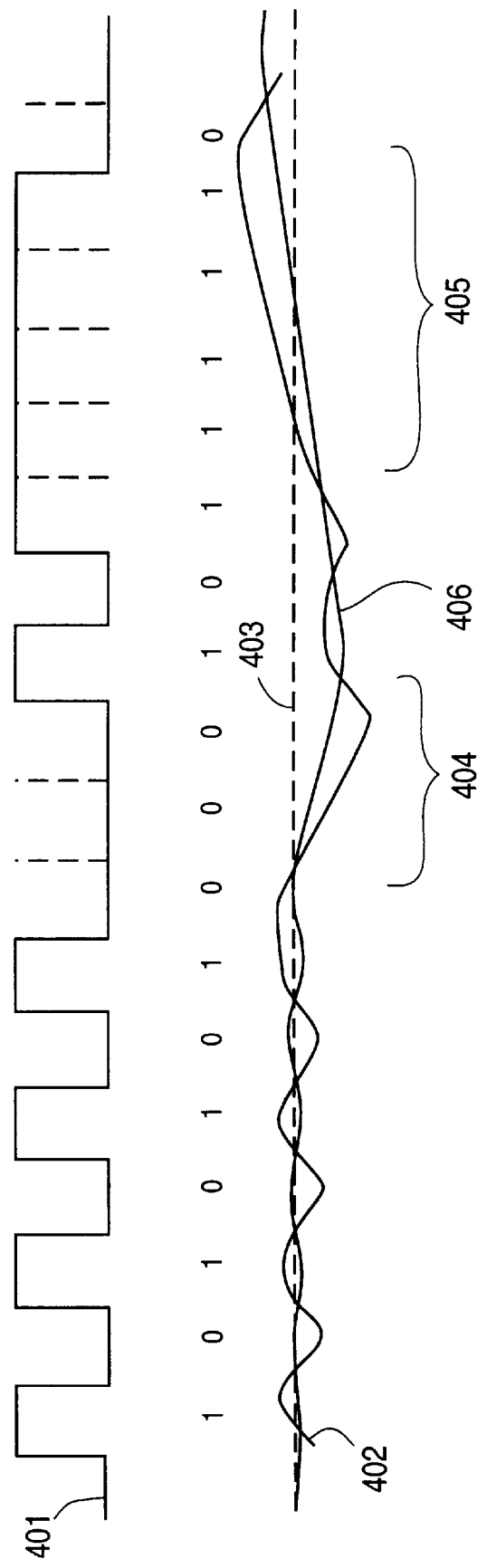
FIG. 4 is a diagram illustrating a transmitted data signal 401 and a received data signal 402.

FIG. 4 is a diagram illustrating a transmitted data signal 401 and a received data signal 402. The received data signal 402 is distorted by the effects of passing through a non-ideal communication channel, for example twisted pair copper wiring. The attenuation of high frequency components resulting from properties of the cable or other parts causes the input data signal to "wander" up (in section 405) and down (in section 404) relative to threshold 403 for runs of successive 1's or 0's, respectively. When this wandering effect has moved the signal's average value sufficiently away from zero, then an opposite bit value may not cross the zero threshold at all. When this phenomenon happens, a receiver circuit using a simple sense amplifier input will detect an erroneous value and a bit error will have occurred.

The RC filter according to one embodiment of the invention provides the ability to track the wander. By changing the resistance, matching is provided for a broad range of wander rates. As illustrated in the block diagram of FIG. 1, the RC weighted tracking signal is subtracted from the input signal in the input section of the two-ported sampler/sense amplifier circuit. Note that the tracking signal is sampled in an identical manner as the input signal so that there is no systematic input offset introduced that would skew the subtraction. Threshold 406 is an adaptive threshold that allows accurate recovery of data from received data signal 402.

In addition to simply adjusting the R to get the correct time constant, the amplitude of the tracking signal is also adjusted. For instance, for longer cable lengths with greater high frequency attenuation, the amount of wander is larger compared to the amplitude of a single bit. Thus, not only is R increased (to increase the RC time constant to match the line better), but also the amplitude of the tracking signal is increased relative to the input signal.

Figure 9:
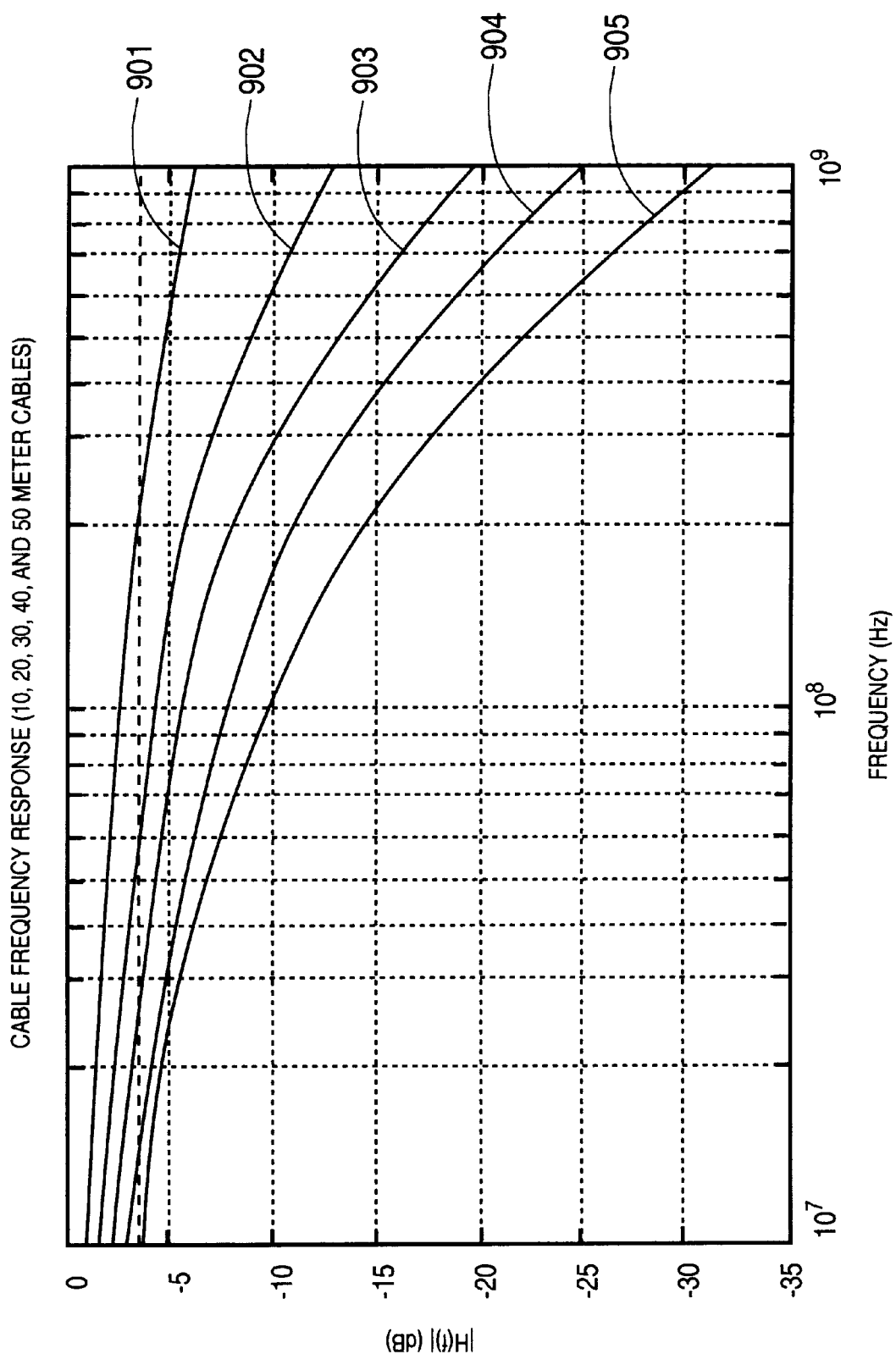
FIG. 9 is a graph illustrating the cable frequency response curves for various lengths of cable.

FIG. 9 is a graph illustrating the cable frequency response curves for various lengths of cable. The curves are representative of the characteristics of Category 5 unshielded twisted pair (CAT-5 UTP) cable. Curve 901 represents the cable frequency response for a 10 meter cable. Curve 902 represents the cable frequency response for a 20 meter cable. Curve 903 represents the cable frequency response for a 30 meter cable. Curve 904 represents the cable frequency response for a 40 meter cable. Curve 905 represents the cable frequency response for a 50 meter cable.

Figure 10:
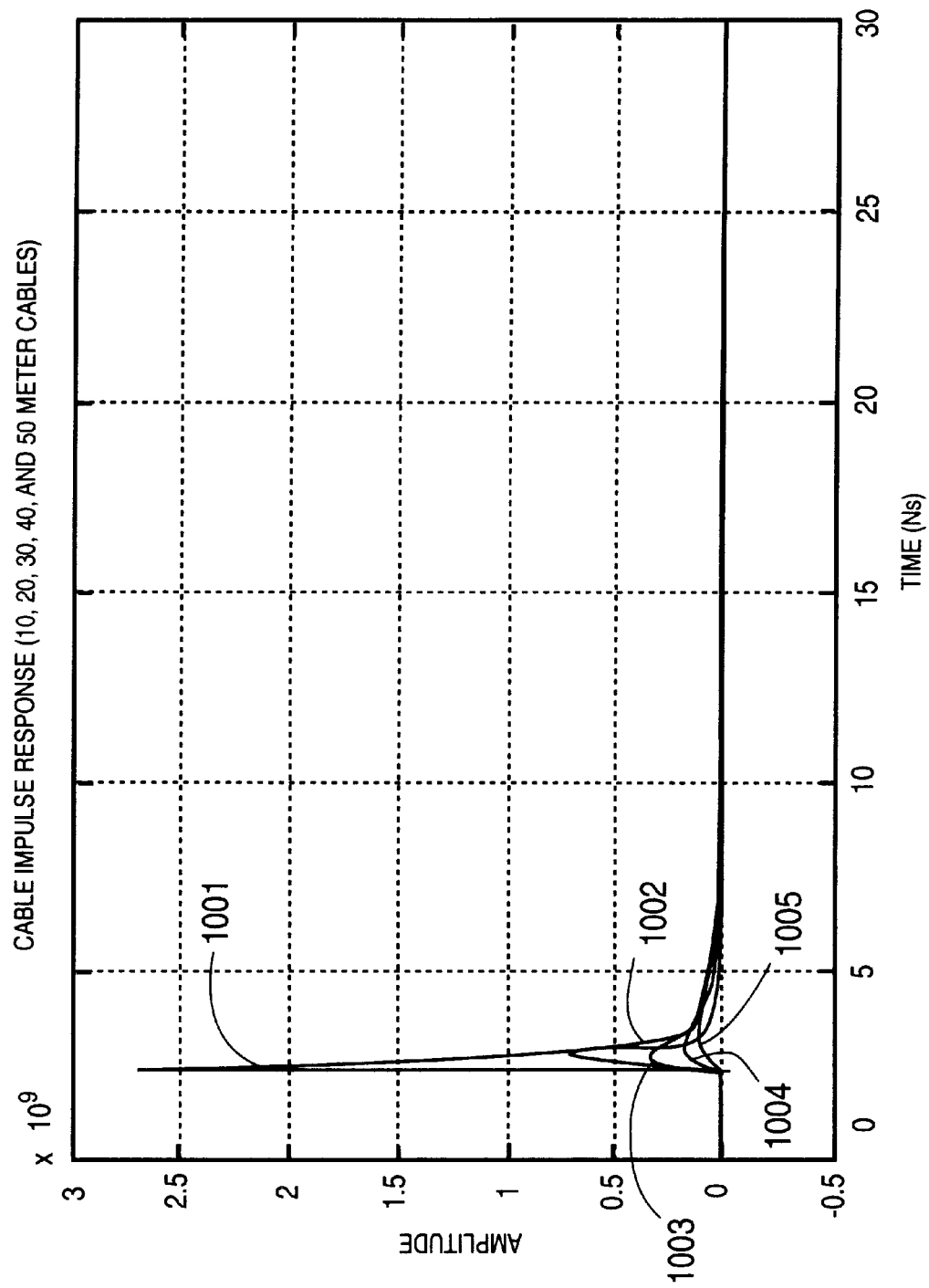
FIG. 10 is a graph illustrating the cable impulse response curves for various lengths of cable.

FIG. 10 is a graph illustrating the cable impulse response curves for various lengths of cable. The curves are representative of the characteristics of Category 5 unshielded twisted pair (CAT-5 UTP) cable. Curve 1001 represents the cable impulse response for a 10 meter cable. Curve 1002 represents the cable impulse response for a 20 meter cable. Curve 1003 represents the cable impulse response for a 30 meter cable. Curve 1004 represents the cable impulse response for a 40 meter cable. Curve 1005 represents the cable impulse response for a 50 meter cable.

For the transfer function in the s-domain, the following relationship exists between Veq(s) and Vin(s), $$Veq(s) = Vin(s) \cdot \left[Ka - Kb\left(\frac{1}{sRC+1}\right)\right], \quad (1)$$

which can be factored into the expression, $$Veq(s) = Vin(s) \cdot (Ka - Kb) \cdot \left[\frac{sRC\left(\frac{Ka}{Ka-Kb}\right)+1}{sRC+1}\right]. \quad (2)$$

Substituting in for the zero and pole, $$sz = \frac{Ka - Kb}{RCKa}, sp = \frac{1}{RC'} \quad (3)$$

the transfer function becomes $$\frac{Veq(s)}{Vin(s)} = (Ka - Kb) \cdot \left[\frac{s/sz+1}{s/sp+1}\right]. \quad (4)$$

The following properties can be noted about this equalization function for (low frequencies) s<<sz:

$$\left|\frac{Veq(s)}{Vin(s)}\right| = Ka - Kb \text{ and } \angle \frac{Veq(s)}{Vin(s)} = 0°,$$

and for (high frequencies) s>>sp, $$\left|\frac{Veq(s)}{Vin(s)}\right| = Ka \text{ and } \angle \frac{Veq(s)}{Vin(s)} = 0°,$$

which is equal to the ratio of the pole to zero frequencies, $$\frac{sp}{sz}.$$

The automatic equalization control is a control system that monitors the data that the receiver is recovering and, based on its assessment of the equalization that needs to be added or removed, adjusts the equalization resistor and/or the equalization gain in order to effect that modification.

The method used to implement the automatic equalization control (AEC) is described. Sampling already occurs two times per bit in order to implement phase detection for the phase lock loop (PLL). One sample is at the center of a bit, and the second sample is at the transition position. Instead of discarding the transition sample after conducting the phase detection that is used by the clock recovery PLL, the automatic equalization control uses the transition sample to measure whether equalization is needed. Thus, the AEC system does not add any additional complexity or circuitry to the core datapath of the receiver, thereby avoiding limitations on high data rates that such can be imposed by such complexity.

The automatic equalization control analyzes the transition samples to determine the current relationship between the analog equalization and the channel denotation. For example, in the case that a five ones are in the bit stream followed by a zero, the transition between the fifth one and the following zero will not be centered exactly on the clock edge that samples that transition if the ISI is not exactly cancelled. For instance, if no equalization is performed, then the transition will tend to happen late every time. On the other hand, if equalization has been applied and has over-attenuated the low frequency component of the signal, then the transition will tend to happen early every time. This information can be extracted by analyzing the transition samples for these types of deterministic jitters. In order to compensate for the fact that random jitter on the clock and data will possibly perturb a transition measurement, we can apply digital and analog filtering to low pass filter the information and base equalization decisions on the long term average of the effect of the equalization. Such low pass filtering is acceptable since the automatic equalization control does not require a high bandwidth control loop. It need only be fast enough to track any thermal, aging or other effects that will understandably change the equalization requirements needed. In fact, the analog equalization should not change too quickly since that could introduce a phase shift in the received data which could cause jitter and bit errors. Since the AEC has a low bandwidth, the clock recovery PLL can easily adjust for any of the slow changes in the equalization transfer function.

If, on rising transitions, more equalization is needed (transition is late), the resistance of the PMOS pass transistor is increased. If, on falling transitions, more equalization is needed (transition is late), the resistance of the NMOS pass transistor is increased. If transitions following run lengths of one, two, or three identical bits are generally early, while transitions following run lengths of four or five identical bits are generally late, then too much gain is currently applied and the gain should be reduced. If the opposite is the case then the gain should be increased.

Digital logic is used to search the data and transition bits to determine the effects of the intersymbol interference (ISI) and to generate the correct charge pump up/down signals. Since the bandwidths of the AEC are so low, the large loop delay in the control loop associated with buffering to perform the sequential logic in a low-frequency circuitry in one embodiment of the circuit is completely tolerable.

A notable feature of the adjustable equalization resistor in one embodiment of the analog equalizer is that it is constructed of both PMOS and NMOS pass transistors, and both pass transistors have individual control voltages. The dual pass gate structure extends the voltage range of the adjustable resistor. Additionally, the automatic equalization control circuit individually controls the PMOS and NMOS control voltages in such a way as to cause the first derivative of the resistance to become zero (i.e. reach a saddle point) at the common-mode level of the input signal. A PMOS or NMOS pass resistor alone does not behave in this manner since its resistance is monotonically increasing or decreasing as a function of the common-mode input signal level that is across the source and drain terminals of the transistor. The method used in the automatic equalization control (AEC) to achieve this state is simply that the AEC considers rising edge transitions separately from falling edge transitions and adjusts the PMOS and NMOS control voltages individually to equalize each transition separately. When this is done, the resistance saddle point for the input voltage common-mode level should be automatically adjusted as a consequence, since otherwise one transition direction would not be exactly equalized.

Note that common mode variations in the input data and supply variations of low frequency which might change the effective resistance of the PMOS and NMOS pass transistors that provide the adjustable resistance are corrected by the AEC, but high frequency bounces are not. Rather, the bias voltages Vresp and Vresn are constructed in such a way that they maintain the gate to source control voltage, and thus maintain their effective resistances without much change in the face of high frequency bounces on either the supply or the common mode level of the input data. A technique for providing an adjustable resistance element suitable for use with the present invention is disclosed in a pending U.S. patent application entitled "On-Chip Differential Resistance Technique with Noise Immunity and Symmetric Resistance," filed on Oct. 6, 1997, which is incorporated herein by reference.

Figure 2:
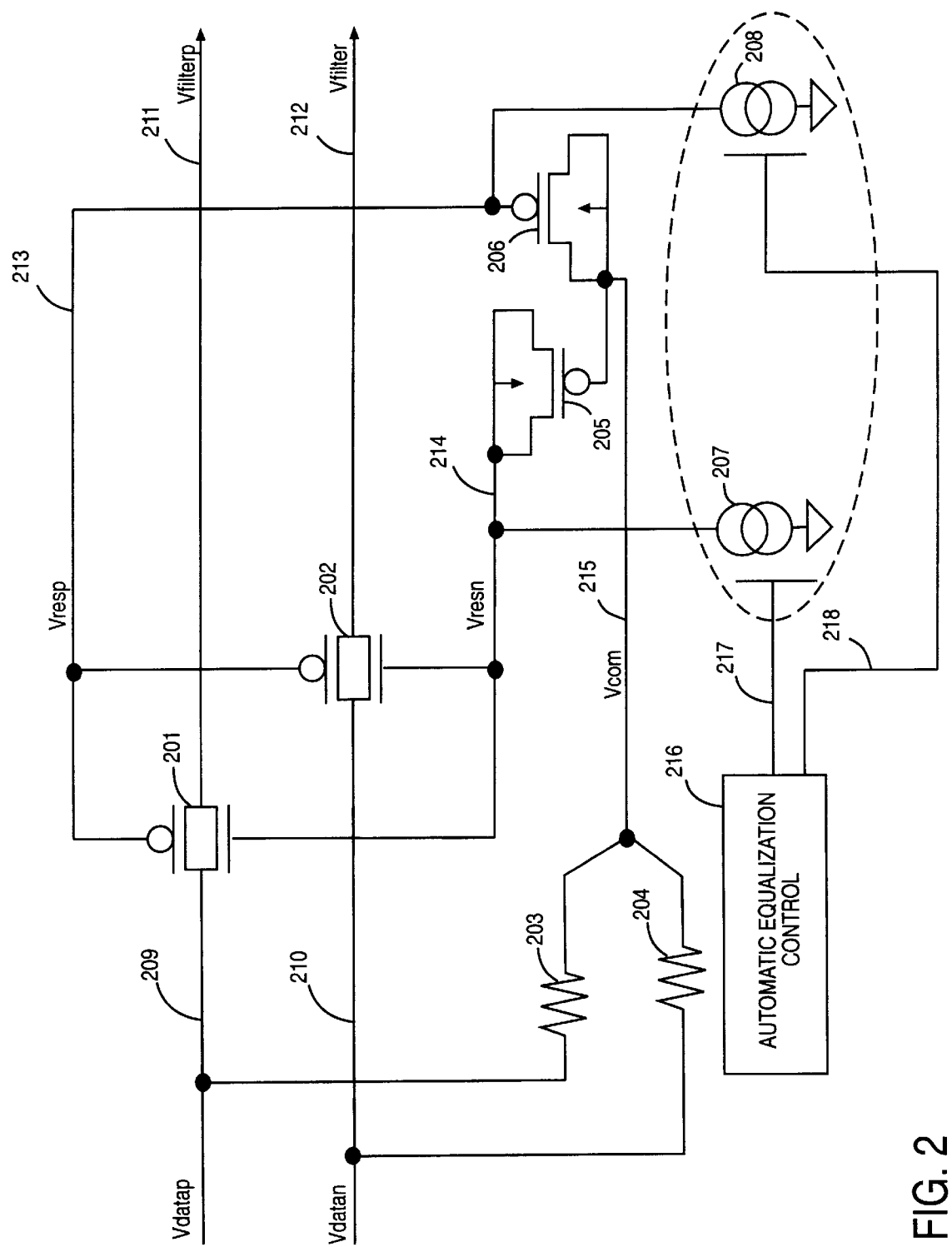
FIG. 2 is schematic diagram illustrating an RC-based equalizer according to one embodiment of the invention.
Figure 3:
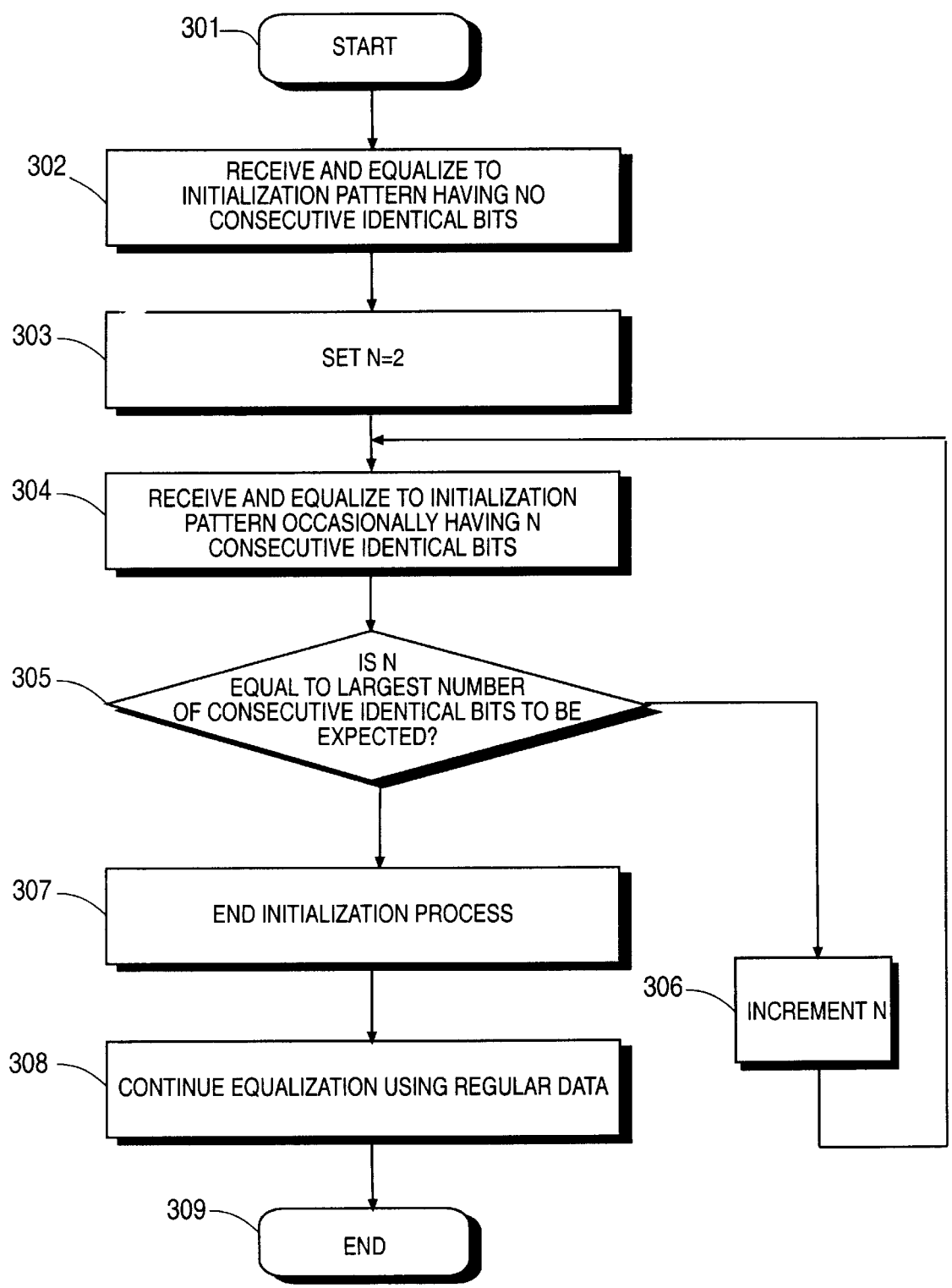
FIG. 3 is a flow diagram illustrating an equalization process according to one embodiment of the invention.

FIG. 2 is schematic diagram illustrating an RC-based equalizer according to one embodiment of the invention. The equalizer comprises CMOS transmission gate 201, CMOS transmission gate 202, resistor 203, resistor 204, PMOS transistor 205, PMOS transistor 206, dependent current source 207, dependent current source 208, and automatic equalization control circuit 216.

Input Vdatap 209 is coupled to a first terminal of CMOS transmission gate 201 and to a first terminal of resistor 203. Input Vdatan 210 is coupled to a first terminal of CMOS transmission gate 202 and to a first terminal of resistor 204. A second terminal of CMOS transmission gate 201 is coupled to output Vfilterp 211. A second terminal of CMOS transmission gate 202 is coupled to output Vfiltern 212.

Automatic equalization control 216 is coupled via node 217 to a control terminal of dependent current source 207 and via node 218 to a control terminal of dependent current source 208. A first terminal of dependent current source 207 is coupled via node Vresn 214 to an NMOS gate terminal of CMOS transmission gate 201, to an NMOS gate terminal of CMOS transmission gate 202, and to source, drain, and substrate terminals of PMOS transistor 205. A first terminal of dependent current source 208 is coupled via node Vresp 213 to a PMOS gate terminal of CMOS transmission gate 201, to a PMOS gate terminal of CMOS transmission gate 202, and to a gate terminal of PMOS transistor 206.

A second terminal of dependent current source 207 is coupled to ground. A second terminal of dependent current source 208 is coupled to ground. A second terminal of resistor 203 and a second terminal of resistor 204 are coupled via node Vcom 214 to a gate terminal of PMOS transistor 205 and to source, drain, and substrate terminals of PMOS transistor 206.

In one embodiment, the Vcom node tracks the variations of the common-mode level of the input to a bandwidth of at least 500 MHz. (However, the resistance values of resistors 203 and 204 are small enough to not put significant loading on the input signals.) Thus, any bounces on the common-mode level are tracked by the Vcom signal up to that frequency. The Vcom node is applied to the opposite node of the filter capacitors that hold the Vresp and Vresn bias voltages so that those bias voltages can maintain a constant gate to source voltage across the adjustable resistor NMOS and PMOS transistors.

Supply bounces are rejected by a different mechanism. Any parasitic capacitance from chip vdd or gnd to the Vcom, Vresn, or Vresp nodes forms a capacitor divider with the PMOS filter capacitors across Vresn-Vcom and Vresp-Vcom for attenuating the supply noise. For one embodiment, using calculated layout parasitics, the division ratio attenuates supply noise by better than a factor of 300. Any noise that does get in is then attenuated within the bandwidth of the common-mode tracking circuit (a time constant of around 2 ns for one embodiment). Supply noise influence on the PMOS and NMOS pass transistor resistance due to body effect threshold shifts is not compensated for in one embodiment of the circuit. Thus, this parasitic effect is expected to dominate the supply induced modulation of the equalization resistance.

For initialization, the automatic control (AEC) is placed into a state where the correct amount of equalization can be applied (i.e. it "locks" to the channel's properties). If the right amount of equalization is not applied when the data pattern starts to be sent, so many bit errors may occur that the equalization circuitry may never get into the acquired state. Once the equalization is in lock, it never needs another explicit calibration period since it tracks the channel attenuation using the transitions that are continually present in run length encoded NRZ data, and which are already being sampled in order to generate the error signal needed for the clock recovery PLL. In order to perform the initial calibration, a known pattern is sent that allows the equalization to acquire lock. The AEC starts off in a reset state immediately after the receiver's "reset" is disabled. In the reset state the Vresn and Vresp bias signals set the PMOS and NMOS pass transistors to have a low resistance (i.e., the equalization pole and zero are both at frequencies well above the spectral content of input data, thus putting the equalization in an off state). Also, the gain is set so that Ka is approximately ¾ and Kb is approximately ¼, such that the maximum equalization gain is around 6 dB. The initial pattern that the receiver expects is a 10101010 . . . pattern for some period of time (typical a few 10th of a millisecond to a millisecond). This pattern is used to lock the receiver PLL to the frequency and phase of the incoming signal, and no equalization is needed since this pattern can generate no inter-symbol interference (ISI). Note that this initial pattern is typically used as an initialization pattern in fiber channel and gigabit ethernet.

Additional patterns are transmitted that allow the AEC to initialize the equalization resistance and gain to the line properties. For some period of time, the 101010 . . . pattern continues except that, separated by large intervals in the pattern, a run length of two zeros or two ones is interspersed in the pattern. This pair of consecutive zeros or ones allows the AEC to adjust the equalization resistances to the correct values needed to compensate for the ISI created by the run length of two identical data. The long series of 101010 . . . between each run length event allows the PLL to maintain lock even if the transition after the run lengths of two is completely missing. Thus the AEC doesn't risk loss of lock in the basic clock recovery circuits while performing this procedure. Next run lengths of three ones and three zeros are interspersed along with the run lengths of two for some period of time. This process gives the AEC enough information to set the equalization gain as well as the equalization resistance. As the equalization resistance is being adjusted, the PMOS and NMOS resistances are adjusted separately using the rising and falling transitions. Then, run lengths of four are added and interspersed for a period of time, and finally run lengths of five are added and interspersed. If run lengths of six or greater are possible, then the initialization continues until the longest run length has been included in the equilibration process. For 8B10B encoded data, however, run lengths of five are the maximum seen, and the initialization pattern needs to go no further. At this point the AEC should have locked onto the equalization resistance and gain values that are appropriate for the current channel and operating conditions, and actual data can start to be sent. Note that the transmitter is not required to take an active part in the equalization initialization except that a known sequence of patterns needs to be sent during initialization.

This initialization process offers compatibility with the initialization already being performed in fiber channel and gigabit ethernet. However, rather than stopping once the non-ISI affected single frequency signal of the 10101010 . . . pattern is locked onto by the clock recovery circuit, The initialization pattern is continued with signals that have a controlled amount of progressively increased spectral content and that allow the receiver to initialize the additional automatic equalization control appropriately for the channel's attenuation properties.

As described above, the automatic equalization technique uses an initialization pattern to self-adapt to poor cables or other causes of channel attenuation. Then, during normal transmission, the process slowly tracks out aging, supply, and temperature variations and maintains the equalization lock. The initialization process accommodates greater than 6 dB of equalization, which is useful since 6 dB of channel attenuation implies that some high frequency bits will not cross the receiver threshold at all.

While this equalization technique does introduce phase shifts for frequencies between and near the zero (sz) and the pole (sp), it is can be simply implemented, does not present significant loading that could erroneously shift the termination impedance, and does not require major modification of the sampler/sense amplifiers and bias circuits to add the extra port needed. Notably, in comparison to an analog decision feedback equalizer (DFE) or analog forward feedback equalizer (FFE), many extra input ports are not required to implement the potentially large number of analog multiply-add terms. The RC filter acts to approximate a DFE finite impulse response (FIR) filter that has a large number of exponentially decaying weights, and it is analogous to a DFE infinite impulse response (IIR) filter with a single term. For some high-speed digital subscriber line (HDSL) applications, the post-cursor inter-symbol interference (ISI) tail is so long that an IIR filter, as provided by one embodiment of the invention, is very useful for tracking out the long ISI tail. In comparison to transmitter-based digital FFE equalization, the present invention avoids the need for extra circuitry in the transmitter, which is a significant advantage, since high transmission rates (for example, >4 Gbps) cannot be supported by transmitter-based digital FFE equalization implemented in standard CMODS. Thus, an analog-receiver-based equalization, as provided by one embodiment of the invention, supports higher data rates than otherwise possible. Also, this embodiment of the invention provides the ability to detect at the receiver the exact amount of equalization needed to compensate the actual channel attenuation, which cannot be provided by transmitter-based equalization. Transmitter-based equalization must either be preprogrammed by a user who needs to know the channel properties or require, some explicit separate knowledge about the cable to be given to the transmitter (for instance, by providing electrical keying of the cable that the transmitter can decode). Thus, receiver-based equalization avoids the problems of transmitter-based equalization by allowing a user to reconfigure cabling without having to provide information to describe the reconfiguration and without having to used specially-keyed or identified cabling. Rather, the receiver automatically compensates for the length and type of cable used to connect systems.

Prior art adaptive receiver equalization uses crude measures such as signal strength to generate a function of how much equalization is needed. Apart from inaccuracies and consequential suboptimal fit, such methods required that the transmitter send a fixed amplitude; otherwise, the receiver has no way of knowing the attenuation that led to the receive signal strength. The method of automatic equalization control according to one embodiment of the invention generates a very precise error signal that is a function of whether more or less equalization is needed. The error signal can differentiate how much more or less equalization is individually needed at all frequencies that are used in the system (for instance, by looking at different run-length patterns, and adjusting the equalization so that transitions following any run length are not phase-shifted). Thus, this method can, in general, be used broadly to control other more complex receiver based analog equalization front ends, such as multi-pole filters, or multi-tap analog FIR filters, or even digitally based equalization methods such as multi-bit ADC's followed by variable-weighted FIR filters.

Figure 5:
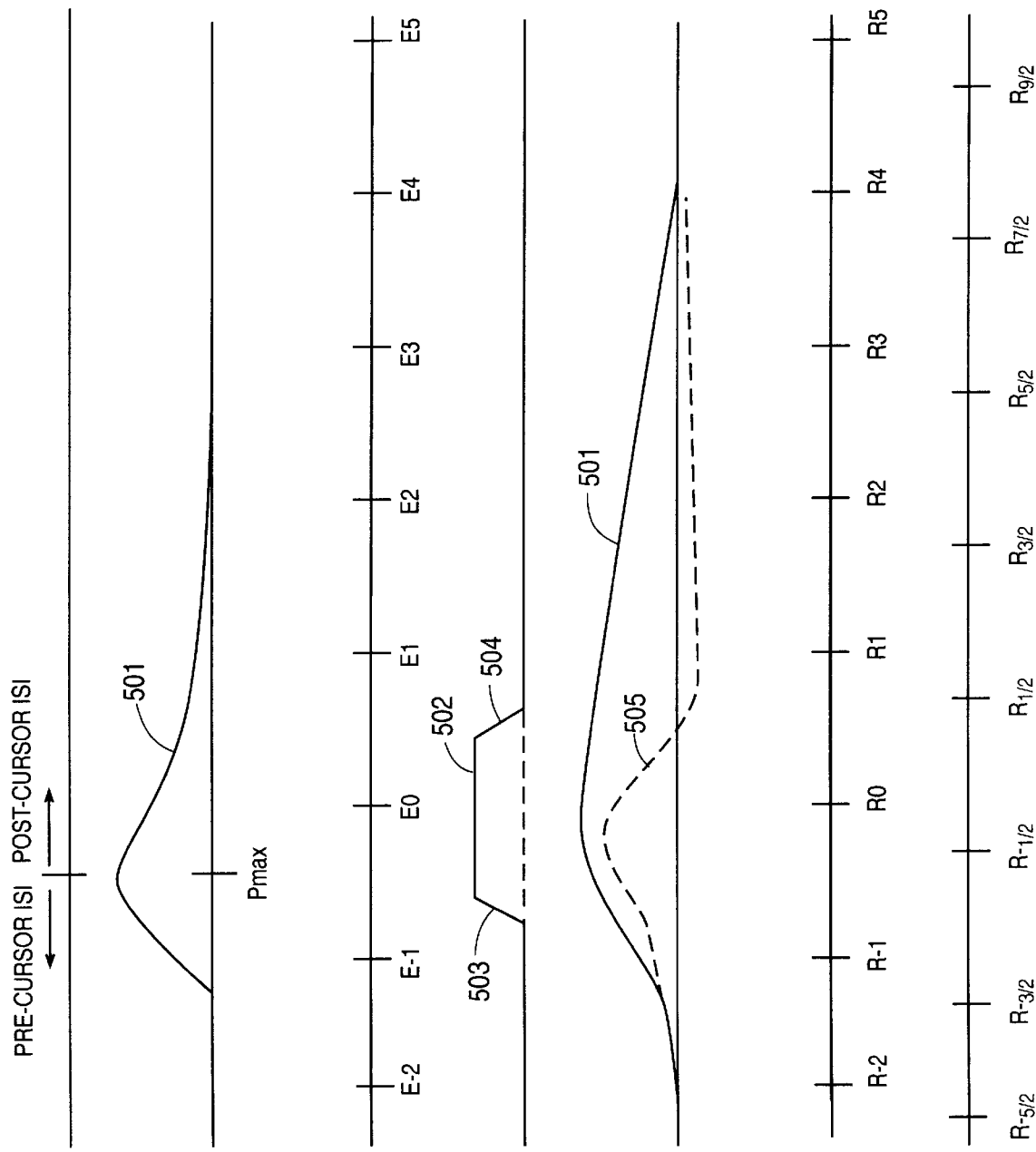
FIG. 5 is a diagram illustrating the impulse response of a communication channel, a bit as transmitted, and the received bit response.

FIG. 5 is a diagram illustrating the impulse response of a communication channel, a bit as transmitted, and the received bit response. The impulse response that applies for transmission of a bit over a cable, illustrated by waveform 501, is affected by both pre-cursor ISI and post-cursor ISI. Note that the leading and trailing edges both get wider as the cable gets longer.

Pmax denotes the point of maximal energy in the impulse response. Pre-cursor ISI affects the portion of the impulse response before Pmax, while post-cursor ISI affects the portion of the impulse response after Pmax. The sampled version of the impulse response comprises samples taken at $E_{-2}, E_{-1}, E_0, E_1, E_2, E_3, E_4, E_5, \ldots$ A bit, as transmitted, is illustrated as waveform 502. Leading edge 503 and trailing edge 504 require a finite transition time, which might, for example, for each edge, by about 20 percent of the duration of the bit.

Waveform 505 represents a received bit response. The received bit response is equal to the impulse response of the communication channel convolved with the transmitted bit waveform (received bit response=impulse * bit). The received bit response is sampled at two different sets of points. Bit center position samples are taken at points $R_{-2}, R_{-1}, R_0, R_1, R_2, R_3, R_4, R_5 \ldots$. Bit edge transition position samples are taken at points $R_{-5/2}, R_{-3/2}, R_{-1/2}, R_{1/2}, R_{3/2}, R_{5/2}, R_{7/2}, R_{9/2}, \ldots$.

Conceptually, Rp contains the information to be recovered and $R_1, R_2, R_3, R_4, \ldots$ represent ISI that should be cancelled to avoid interference with future bits. Note that $R_{-1}, R_{-2}$ may also interfere with previous bits, but for CAT5 twisted pair or coaxial cabling, post-cursor ISI is typically a more significant problem. Moreover, post-cursor ISI is easier to cancel since it is causal, whereas pre-cursor ISI is potentially noncausal. By averaging the transition phase errors, a comparison can be made between $R_{-1/2}$ and $R_{1/2}, R_{3/2}, \ldots, R_{-1/2}, R_{-3/2}, \ldots$. In order for there to be a transition at all, $R_{-1/2}$ and $R_{1/2}$ are of opposite phases, but all of the other coefficients are added or subtracted depending on their bit's value vs. Bo (i.e., coefficient i, Ci, is $-1$ if Bo $\oplus$ Bi=1 and $+1$ if Bo $\oplus$ Bi=0.

When a receiver is perfectly equalized, the coefficients provide the following result:

$\ldots + C_{-2} R_{-5/2} + C_{-1} R_{3/2} + R_{-1/2} - R_{1/2} + C_2 R_{3/2} + C_3 R_{5/2} + \ldots = 0$ for all values of $C_i$ (which depends on particular pattern around the bit) and for the relatively fixed R coefficients of the channel. However, for the impulse response above, the zero equality is difficult to achieve in a practical system. Instead, if the result is greater than zero, the transition will tend to happen early, while if the result is less than zero, the transition will tend to happen late. By looking at different patterns of bits, the matrix can be inverted to determine which values of R's should be modified.

Analog equalization has a benefit over DFE in that bit errors do not work their way through the digital filter and cause noise on subsequent samples.

Figure 6:
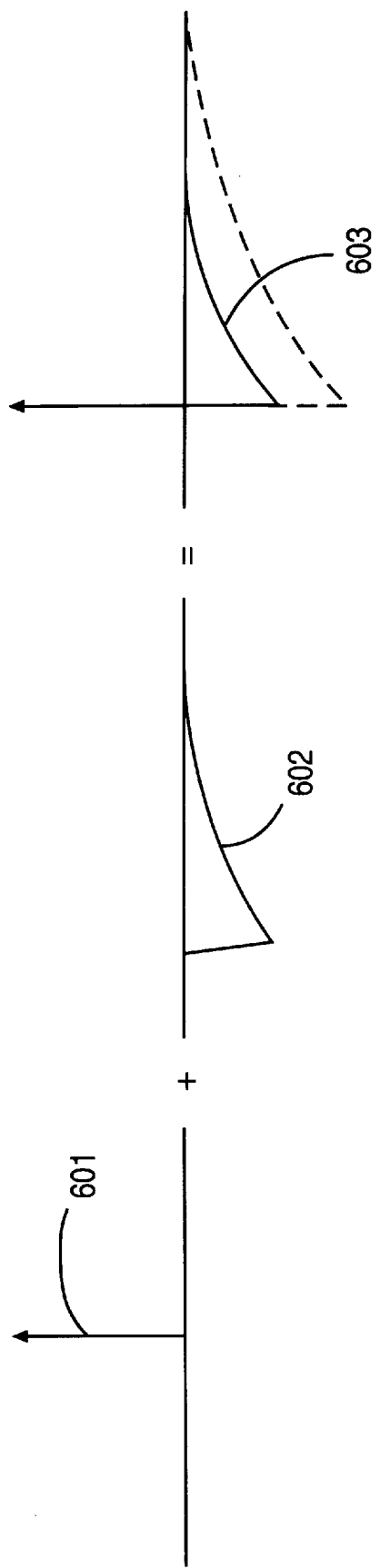
FIG. 6 is a diagram illustrating an impulse function obtained by subtracting an RC weighted version of a receive signal from the receive signal.

Any equalization can be modeled as an additional equalization impulse response that is convolved against the channel's impulse response to reduce or eliminate the pre-cursor or post-cursor ISI. For example, FIG. 6 is a diagram illustrating an impulse function obtained by subtracting an RC weighted version of a receive signal from the receive signal. Waveform 601 represents an impulse function. Waveform 602 represents an RC weighted version of a receive signal. Waveform 603 represents the resulting waveform.

When the RC equalization filter is applied to the channel's impulse response, illustrated as waveform 501 in FIG. 5, the impulse sharpens (but attenuates somewhat at Eo since this equalization is passive subtractive). The resulting waveform is illustrated as waveform 505 in FIG. 5.

Other errors come in the approximations used in tracking systematic transition phase shifts. A finite number of bits is selected to pattern match against, thereby assuming that coefficients farther away are equal to zero. For instance, if runs of five bits are selected, then an attempt is made to reduce $R_{1/2}, R_{3/2}, R_{5/2}, R_{7/2}$, and $R_{9/2}$ but all other R's are assumed to be equal to zero.

The ideal case would be to track bits from negative infinity to positive infinity. Clearly, it is impractical to track an infinite number of bits. However, smaller numbers of bits can be practically tracked. For example, if 20 bit patterns were tracked, 20 linearly independent data patterns would be needed (i.e., the matrix must not be singular).

Another error source is that $R \pm n/2$ for $n=1, 3, 5, 7, \ldots$ are equalized, yet the samples are on $R \pm n$ for $n=0, 1, 2, 3, \ldots$, so the equalized pulse may not be ideal.

$$\begin{array}{c} \phantom{Pattern A\ 000001} \quad c_{-1/2} \ c_{1/2} \ c_{3/2} \ c_{5/2} \ c_{7/2} \ c_{9/2} \end{array}$$

$$\begin{array}{l} \text{Pattern A} \ 000001 \\ \text{Pattern B} \ 100001 \\ \text{Pattern C} \ 110001 \\ \text{Pattern D} \ 111001 \\ \text{Pattern E} \ 111101 \end{array} \begin{bmatrix} 1 & -1 & -1 & -1 & -1 & -1 \\ 1 & -1 & -1 & -1 & -1 & 1 \\ 1 & -1 & -1 & -1 & 1 & 1 \\ 1 & -1 & -1 & 1 & 1 & 1 \\ 1 & -1 & 1 & 1 & 1 & 1 \end{bmatrix} \cdot \begin{bmatrix} R_{-\frac{1}{2}} \\ R_{\frac{1}{2}} \\ R_{\frac{3}{2}} \\ R_{\frac{5}{2}} \\ R_{\frac{7}{2}} \\ R_{\frac{9}{2}} \end{bmatrix} = \begin{bmatrix} P_1 \\ P_2 \\ P_3 \\ P_4 \\ P_5 \end{bmatrix}$$

In one embodiment, the P vector, which represents the phase errors for transitions following patterns A through E, is obtained by multiplying the vector coefficients $C_{-1/2}$ to $C_{9/2}$ by the R weights $R_{-1/2}$ to $R_{9/2}$, as illustrated above. The matrix formula shows how six patterns set ±1 weights for the C coefficients that multiply with the R weights to output phase errors $P_1$ through $P_6$. To deduce the actual channel output from a single bit (i.e. the bit response), the C's matrix is first inverted, then multiplied by the P vector. However, two-valued systematic transition late/early information only tells us the sign of the equalization error. Simply inverting the matrix does not provide information as to how much additional equalization should be applied. Thus, an iterative technique is used that can track over time the equalization need given the late/early information.

The invention may be practiced with a smaller number of bits (for example, five). Such a simplification reduces the control complexity with minimal impact on adaptation if most of the received bit response energy is contained in five bit periods.

Several bit patterns are examined to determine the proper equalization. There is assumed to be no pre-cursor ISI, so $R_{-x}$ is assumed to be equal to zero for $x>1/2$.

Using equalization, it is; attempted to make $R_{-1/2}, R_{1/2}$ equal in magnitude (otherwise, there is an asymmetry in the rise and fall times) and all other R's equal to zero (otherwise, for some C coefficients, i.e., some bit patterns, the R's will shift the signal level).

Figure 7:
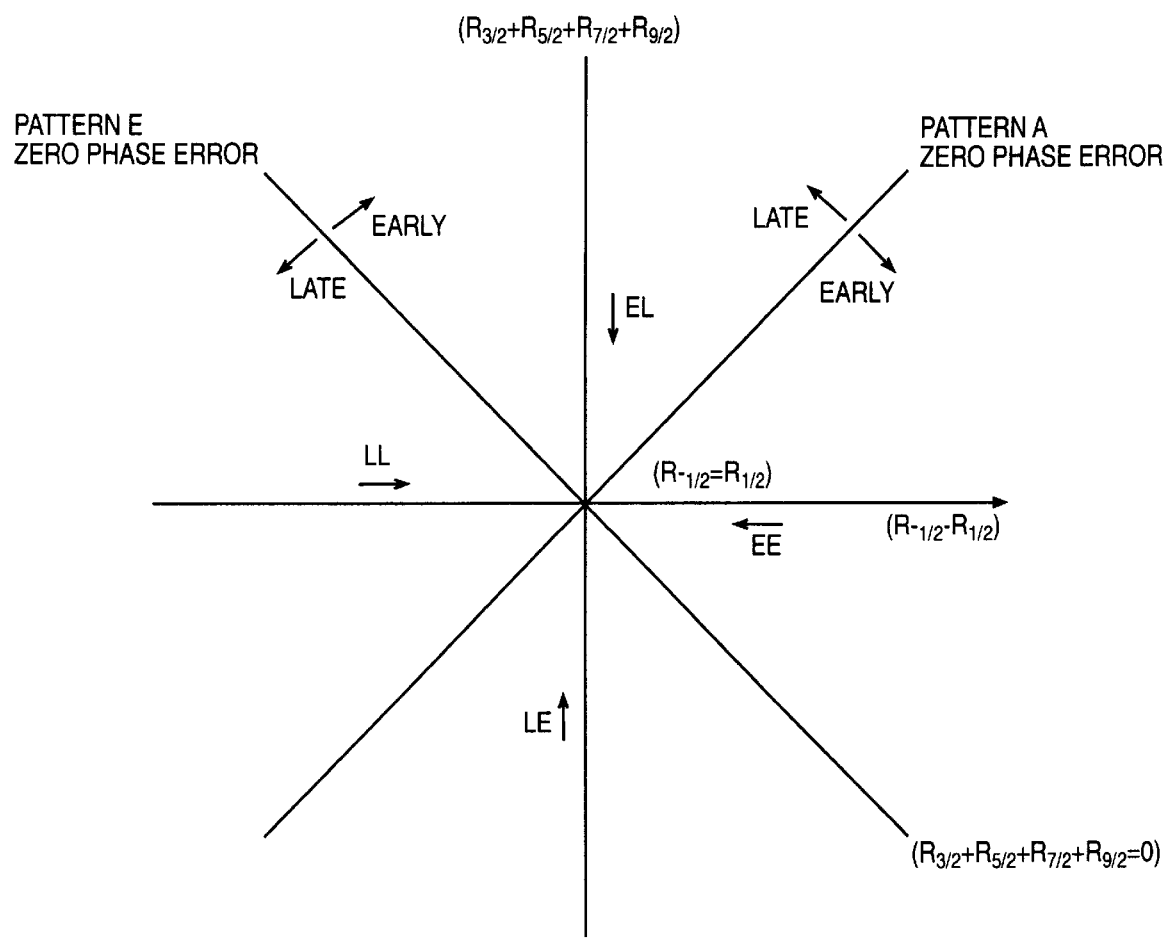
FIG. 7 is a graphical representation of phase relationships that can be used to determine the correct equalization for a communication channel.

Pattern A creates ISI of $(R_{-1/2} - R_{1/2}) - (R_{3/2} + R_{5/2} + R_{7/2} + R_{9/2})$
   if >0 seen as early transition
   if <0 seen as late transition Pattern E creates ISI of $(R_{-1/2} - R_{1/2}) + (R_{3/2} + R_{5/2} + R_{7/2} + R_{9/2})$
   if >0 seen as early transition
   if <0 seen as late transition FIG. 7 is a graphical representation of phase relationships that can be used to determine the correct equalization for a communication channel. The correct equalization is represented by the origin of the graph since $R_{-1/2} = R_{1/2}$ and $(R_{3/2} + R_{5/2} + R_{7/2} + R_{9/2}) = 0$. Thus, a control process tracks the equalization correction to the center of the graph. From region EL, the control process decreases the sum $(R_{3/2} + R_{5/2} + R_{7/2} + R_{9/2})$. From region LE, the control process increases the sum $(R_{3/2} + R_{5/2} + R_{7/2} + R_{9/2})$. From region LL, the control process increases the difference $(R_{-1/2} - R_{1/2})$. From region EE, the control process decreases the difference $(R_{-1/2} - R_{1/2})$.

Equalization for both pre-cursor and post-cursor ISI can be provided by extending the current bit and changing the sum $(R_{3/2} + R_{5/2} + R_{7/2} + R_{9/2})$ to $(R_{-7/2} + R_{-5/2} + R_{-3/2} + R_{3/2} + R_{5/2} + R_{7/2} + R_{9/2})$.

Other patterns can also be used with the late/early phase detection to obtain corrections needed for individual R values. Note that $R_{-1/2}$, $R_{1/2}$ are already compensated by being adjusted to be equal in value.

| | | |
|---|---|---|
| Pattern A | 000001 | $(R_{-½} - R_{½}) - (R_{3/2} + R_{5/2} + R_{7/2} + R_{9/2})$ |
| Pattern A1 | 100001 | $(R_{-½} - R_{½}) - (R_{3/2} + R_{5/2} + R_{7/2} - R_{9/2})$ |
| Pattern A2 | 010001 | $(R_{-½} - R_{½}) - (R_{3/2} + R_{5/2} - R_{7/2} + R_{9/2})$ |
| Pattern A3 | 001001 | $(R_{-½} - R_{½}) - (R_{3/2} - R_{5/2} + R_{7/2} + R_{9/2})$ |
| Pattern A4 | 000101 | $(R_{-½} - R_{½}) - (-R_{3/2} + R_{5/2} + R_{7/2} + R_{9/2})$ |
| Pattern E | 111101 | $(R_{-½} - R_{½}) - (R_{3/2} + R_{5/2} + R_{7/2} + R_{9/2})$ |
| Pattern E1 | 011101 | $(R_{-½} - R_{½}) - (R_{3/2} + R_{5/2} + R_{7/2} - R_{9/2})$ |
| Pattern E2 | 101101 | $(R_{-½} - R_{½}) - (R_{3/2} + R_{5/2} - R_{7/2} + R_{9/2})$ |
| Pattern E3 | 110101 | $(R_{-½} - R_{½}) - (R_{3/2} - R_{5/2} + R_{7/2} + R_{9/2})$ |
| Pattern E4 | 111001 | $(R_{-½} - R_{½}) - (-R_{3/2} + R_{5/2} + R_{7/2} + R_{9/2})$ |

For the "LL" cases, the value of $R_{1/2}$ needs to be decreased or increased until it has the same amplitude as $R_{-1/2}$.

For the "LE" and "EL" cases, it is known whether to increase or decrease the sum of the additional bits of ISI so that they sum to zero ISI. However, this should be done in a manner such that each ISI coefficient is zero individually also. The exemplary equalization patterns described allow this to occur by providing the information about late/early transition phase errors that partly depend on the individual R coefficients.

An example of one embodiment of the decision process is described. In the "EL" sector, the sum $R_{ISI}$ should be decreased. Sector "EL" denotes that pattern A gave a late transition.
Pattern A:

If pattern A1, pattern A2, pattern A3, pattern A4 are all late, then equalize by decreasing $R_{3/2}$, $R_{5/2}$, $R_{7/2}$, $R_{9/2}$ largely equally.

If one or more of pattern A1–A4 are early, then equalize by decreasing the corresponding one or more $R_{3/2}$, $R_{5/2}$, $R_{7/2}$, $R_{9/2}$ more substantially. A1 corresponds to $R_{9/2}$. A2 corresponds to $R_{7/2}$. A3 corresponds to $R_{5/2}$. A4 corresponds to $R_{3/2}$.

For the "LE" quadrant, a similar process may be used.
Pattern A:

If pattern A1, A2, A3, A4 are all early too, then equalize by increasing $R_{3/2}$, $R_{5/2}$, $R_{7/2}$, $R_{9/2}$ largely equally.

If one or more of pattern A1–4 are late, then equalize by increasing the corresponding R more substantially.

Patterns E1–4 are not necessarily needed since they would give basically the same information, but alternatively patterns E1–4, and not A1–4, could be used with a decision process analogous to the one described above. Adaptive equalization based on rising transitions of the receive signal.

Alternatively or in conjunction with the equalization based on rising transitions, all of the patterns (e.g., 0's and 1's), decision criteria (e.g., late and early), and adaption criteria (e.g., increasing and decreasing attenuation) can be inverted to separately equalize the falling transitions. By equalizing for the falling transitions as well as the positive transitions, a non-linear variable resistance element can be adapted to be symmetric.

Thus, a process is provided to find and adapt the coefficients for a decision feedback equalization system.

Figure 8:
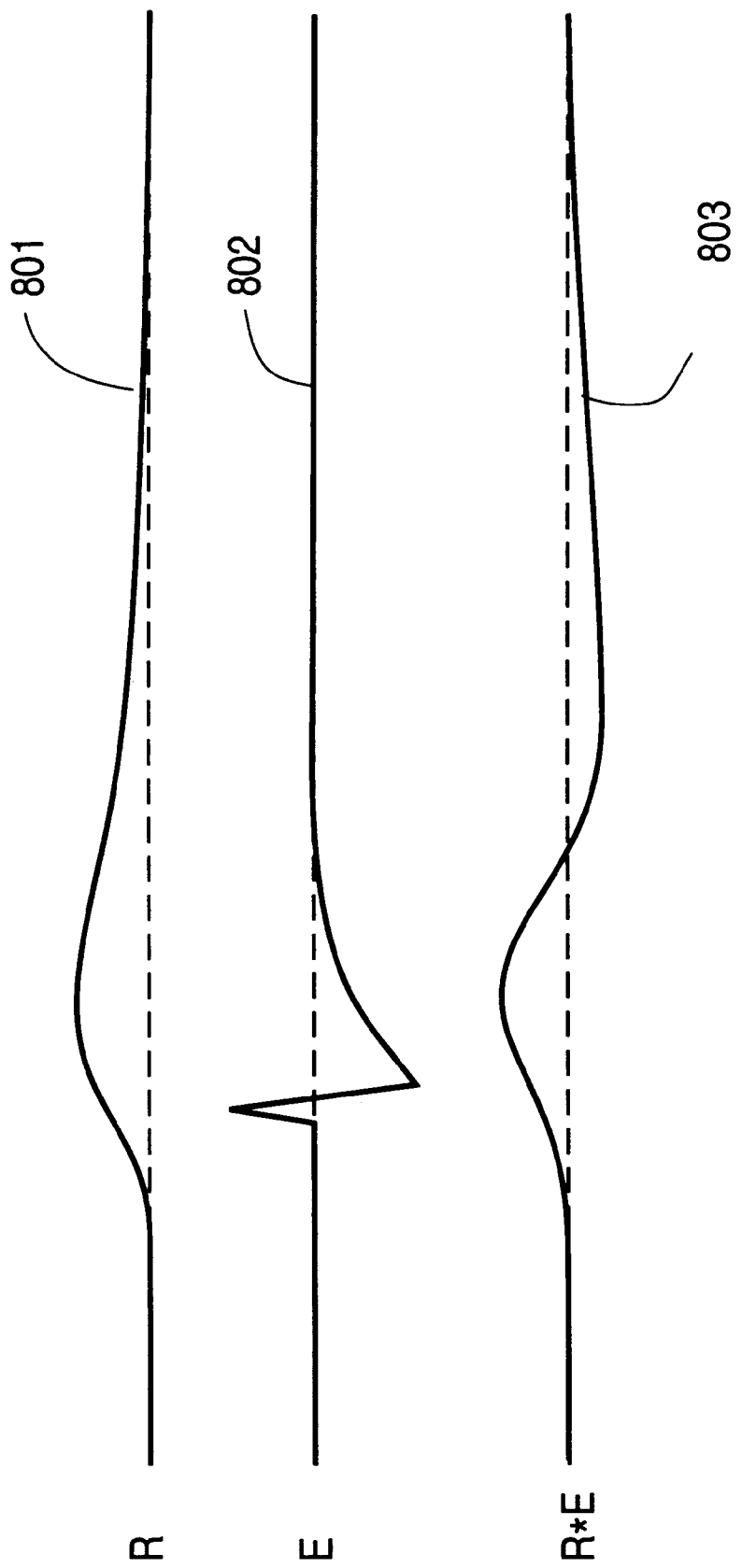
FIG. 8 is a waveform diagram illustrating the convolution of the R vector 801 with the E vector 802 to provide the R*E vector 803.

The analog 1-(RC filter) type of equalization can be modelled as convolving the R vector with a new E vector, as illustrated in FIG. 8. FIG. 8 is a waveform diagram illustrating the convolution of the R vector 801 with the E vector 802 to provide the R*E vector 803.

In discrete form, $$R' = R * E$$

$$= \begin{bmatrix} R_{-\frac{1}{2}} \\ \vdots \\ R_{\frac{9}{2}} \end{bmatrix} * \begin{bmatrix} E_0 \\ \vdots \\ E_5 \end{bmatrix}$$

$$= \begin{bmatrix} R_{-\frac{1}{2}} E_0 \\ R_{\frac{1}{2}} E_0 + R_{-\frac{1}{2}} E_1 \\ R_{\frac{3}{2}} E_0 + R_{\frac{1}{2}} E_1 + R_{-\frac{1}{2}} E_2 \\ R_{\frac{5}{2}} E_0 + R_{\frac{3}{2}} E_1 + R_{\frac{1}{2}} E_2 + R_{-\frac{1}{2}} E_3 \\ \vdots \\ R_{\frac{9}{2}} E_5 \end{bmatrix}$$

$$= \begin{bmatrix} R_{-\frac{1}{2}} \\ R_{\frac{1}{2}} - G\alpha R_{-\frac{1}{2}} \\ R_{\frac{3}{2}} - G\alpha R_{\frac{1}{2}} - G\alpha^2 R_{-\frac{1}{2}} \\ R_{\frac{5}{2}} - G\alpha R_{\frac{3}{2}} - G\alpha^2 R_{\frac{1}{2}} - G\alpha^3 R_{-\frac{1}{2}} \\ \vdots \end{bmatrix}$$

$$= \begin{bmatrix} R_{-\frac{1}{2}} \\ R_{\frac{1}{2}} - G\alpha R_{-\frac{1}{2}} \\ R_{\frac{3}{2}} - G \cdot \left(\alpha R_{\frac{1}{2}} + \alpha^2 R_{-\frac{1}{2}}\right) \\ R_{\frac{5}{2}} - G \cdot \left(\alpha R_{\frac{3}{2}} + \alpha^2 R_{\frac{1}{2}} + \alpha^3 R_{-\frac{1}{2}}\right) \\ \vdots \end{bmatrix},$$

where G represents the amplitude of the RC filtered response subtracted from the main signal, G having a maximum value of one, where $\alpha$ sets the RC time constant in conjunction with the underlying sample spacing, and where

E1=1−G

E2=G·α

E3=−G·α²

E4=−G·α³

The adaptive equation using the RC filter determines the gain G and the time constant, $\alpha$, such that ISI is minimized. For the 6 bit patterns, the transition ISI coefficients are equalized to:

$$R'_{-1/2} = R_{1/2} \cdot E_0 = R_{-1/2}$$

$$R'_{1/2} = R_{1/2} \cdot E_0 + R_{-1/2} \cdot E_1 = R_{1/2} - G\alpha R_{-1/2}$$

-continued $$R'_{3/2} = R_{3/2} \cdot E_0 + R_{1/2} \cdot E_1 + R_{-1/2} \cdot E_2 = R_{3/2} - G\alpha R_{1/2} - G\alpha^2 R_{-1/2}$$

$$R'_{5/2} = R_{5/2} \cdot E_0 + R_{3/2} \cdot E_1 + R_{1/2} \cdot E_2 + R_{-1/2} \cdot E_3$$

$$= R_{5/2} - G\alpha R_{3/2} - G\alpha^2 R_{1/2} - G\alpha^3 R_{-1/2}$$

$$R'_{7/2} = R_{7/2} \cdot E_0 + R_{5/2} \cdot E_1 + R_{3/2} \cdot E_2 + R_{1/2} \cdot E_3 + R_{-1/2} \cdot E_4$$

$$= R_{7/2} - G\alpha R_{5/2} - G\alpha^2 R_{3/2} - G\alpha^3 R_{1/2} - G\alpha^4 R_{-1/2}$$

$$R'_{9/2} = R_{9/2} \cdot E_0 + R_{7/2} \cdot E_1 + R_{5/2} \cdot E_2 + R_{3/2} \cdot E_3 + R_{1/2} \cdot E_4 + R_{-1/2} \cdot E_5$$

$$= R_{9/2} - G\alpha R_{7/2} - G\alpha^2 R_{5/2} - G\alpha^3 R_{3/2} - G\alpha^4 R_{1/2} - G\alpha^5 R_{-1/2},$$

where $G=A/t_p$ (where A is the total area under the curve defined by the RC filter and $t_p$ is the pole's time constant) and $\alpha=e^{-t_s/t_p}$ (where $t_s$ is the bit period (and thus the sample time)).

The following process may be used to allow adaption of G, α coefficients to lock onto channel properties:

If pattern A is late and pattern E is early, and if:
  pattern A1 is late, pattern A2 is late, pattern A3 is late, and pattern A4 is late, then increase both G, α.
  pattern A1 is late and one or more of patterns A2, A3, and A4 is early, then increase G more than α.
  pattern A4 is late and one or more of patterns A1, A2, and A3 is early, then increase α more than G.
  pattern A1 is early, pattern A2 is early, pattern A3 is early, and pattern A4 is early, then increase both G, α.
If pattern A is early and pattern E is late, and if:
  pattern A1 is early, pattern A2 is early, pattern A3 is early, and pattern A4 is early, then decrease both G, α.
  pattern A1 is early and one or more of patterns A2, A3, and A4 is late, then decrease G more than α.
  pattern A4 is early and one or more of patterns A1, A2, and A3 is late, then decrease ox more than G.
  pattern A1 is late, pattern A2 is late, pattern A3 is late, and pattern A4 is late, then decrease both G, α.
If pattern A is late and pattern E is late, then increase G, α.
If pattern A is early and pattern E is early, then decrease G, α.

The present invention can also be used in conjunction with a variety of initialization patterns. One example of an initialization pattern that can be used with present invention is the K28.5 initialization character used with 8B10B coding. The K28.5 initialization character comprises the bit sequence 0011111010 1100000101. The E28.5 initialization character comprises the following six-bit patterns:

| | |
|---|---|
| 001111 | |
| 011111 | |
| 111110 | pattern "not A" |
| 111101 | pattern "E" |
| 111010 | |
| 110101 | pattern "B1" |
| 101011 | |
| 010110 | |
| 101100 | |
| 011000 | |
| 110000 | |
| 100000 | |
| 000001 | pattern "A" |
| 000010 | pattern "not E" |
| 000101 | pattern "A4" |

The following six-bit patterns occur as a result of overlap between adjacent repeated K28.5 initialization characters:

| | |
|---|---|
| 001010 | |
| 010100 | |
| 101001 | pattern "B2" |
| 010011 | |
| 100111 | |

Since the patterns A1, A2, A3 are not present in the K28.5 initialization character, substitutions may be made using the most similar patterns. For example, pattern B1, which is similar to the logical OR of patterns A1 and A2 may be used. Also, pattern B2, which is the logical OR of patterns A1 and A3 may be used. Using the above six-bit patterns, the following process may be used to allow adaption of G, α coefficients to lock onto channel properties:

If pattern A is late and pattern E is early, and if:
  pattern B1 is late, pattern B2 is late, and pattern A4 is late, then increase both G, α.
  pattern B1 is late and either of patterns B2 or A4 is early, then increase G more than α.
  pattern A4 is late and either of patterns B1 or B2 is early, then increase α more than G.
  pattern B1 is early, pattern B2 is early, and pattern A4 is early, then increase both G, α.
If pattern A is early and pattern E is late, and if:
  pattern B1 is early, pattern B2 is early, and pattern A4 is early, then decrease both G, α.
  pattern B1 is early and either of patterns B2 or A4 is late, then decrease G more than α.
  pattern A4 is early and either of patterns B1 or B2 is late, then decrease α more than G.
  pattern B1 is late, pattern B2 is late, and pattern A4 is late, then decrease both G, α.
If pattern A is late and pattern E is late, then increase G, α.
If pattern A is early and pattern E is early, then decrease G, α.

What is claimed is:

1. A method for equalizing a communication channel comprising:
  receiving a first bit pattern comprising an alternating bit pattern, said alternating bit pattern comprising a first bit of a first polarity alternating with a second bit of a second polarity;
  adjusting an equalization parameter based on a first property of said first bit pattern;
  receiving a second bit pattern comprising said alternating bit pattern and a two bit run length pattern, said two bit run length pattern comprising two consecutive identical bits occurring occasionally within said second bit pattern;
  adjusting said equalization parameter based on a second property of said second bit pattern.

2. The method of claim 1 further comprising:
  receiving a third bit pattern comprising said alternating bit pattern and a three bit run length pattern, said three bit run length pattern comprising three consecutive identical bits occurring occasionally within said third bit pattern;
  adjusting said equalization parameter based on a third property of said third bit pattern.

3. The method of claim 2 wherein said third bit pattern further comprises said two bit run length pattern.

4. The method of claim 2 further comprising:
receiving a fourth bit pattern comprising said alternating bit pattern and a four bit run length pattern, said four bit run length pattern comprising four consecutive identical bits occurring occasionally within said fourth bit pattern;
adjusting said equalization parameter based on a fourth property of said fourth bit pattern.

5. The method of claim 4 wherein said fourth bit pattern further comprises said two bit run length pattern and said three bit run length pattern.

6. The method of claim 4 further comprising:
receiving a fifth bit pattern comprising said alternating bit pattern and a five bit run length pattern, said five bit run length pattern comprising five consecutive identical bits occurring occasionally within said fifth bit pattern;
adjusting said equalization parameter based on a fifth property of said fifth bit pattern.

7. The method of claim 6 wherein said fifth bit pattern further comprises said two bit run length pattern, said three bit run length pattern, and said four bit run length pattern.

8. The method of claim 6 further comprising:
adjusting said equalization parameter based on user data transmitted over said communication channel.

9. The method of claim 8 wherein said step of adjusting said equalization parameter based on a first property of said first bit pattern comprises:
adjusting said equalization parameter based on an edge timing of said first bit pattern.

10. The method of claim 9 wherein said step of adjusting said equalization parameter based on said edge timing of said first bit pattern comprises:
adjusting a variable resistance element based on said edge timing of said first bit pattern.

11. The method of claim 10 wherein said step of adjusting said equalization parameter based on said edge timing of said first bit pattern further comprises:
adjusting a variable gain element based on said edge timing of said first bit pattern.

12. The method of claim 9 wherein said step of adjusting said equalization parameter based on said edge timing of said first bit pattern comprises:
adjusting a variable analog filter based on said edge timing of said first bit pattern.

13. The method of claim 11 wherein said step of adjusting said equalization parameter based on said edge timing of said first bit pattern comprises:
adjusting a finite impulse response filter based on said edge timing of said first bit pattern.

14. The method of claim 13 wherein said step of adjusting said finite impulse response filter based on said edge timing of said first bit pattern comprises:
adjusting a digital finite impulse response filter based on said edge timing of said first bit pattern.

15. The method of claim 11 wherein said step of adjusting said equalization parameter based on an edge timing of said first bit pattern comprises:
adjusting a decision feedback equalizer based on said edge timing of said first bit pattern.

16. The method of claim 15 wherein said step of adjusting said decision feedback equalizer based on said edge timing of said first bit pattern comprises:
adjusting a digital decision feedback equalizer based on said edge timing of said first bit pattern.

17. The method of claim 11 wherein said step of adjusting said equalization parameter based on an edge timing of said first bit pattern comprises:
adjusting a feedforward equalizer based on said edge timing of said first bit pattern.

18. The method of claim 17 wherein said step of adjusting said feedforward equalizer based on said edge timing of said first bit pattern comprises:
adjusting a digital feedforward equalizer based on said edge timing of said first bit pattern.

19. A method for equalizing a communication channel comprising:
sampling center samples of bits in a bit stream communicated in a signal received from said communication channel, said sampling occurring near temporal centers of said bits;
sampling edge samples of said bits near temporal edges of said bits;
determining a run length from said center samples;
determining a phase offset from said edge samples;
adjusting an equalization parameter for equalizing said communication channel based on said run length and said phase offset.

20. The method of claim 19 wherein said step of adjusting said equalization parameter comprises:
providing frequency dependent amplitude adjustment of frequency components of said signal, said frequency components comprising lower frequency components and higher frequency components, with lower frequency components of said signal being affected by said frequency dependent amplitude adjustment for longer run lengths and higher frequency components of said signal being affected by said frequency dependent amplitude adjustment for shorter run lengths.

21. The method of claim 20 wherein said step of providing frequency dependent amplitude adjustment comprises:
increasing a lower frequency component amplitude when said phase offset is late for said longer run lengths,
decreasing said lower frequency component amplitude when said phase offset is early for said longer run lengths,
decreasing a higher frequency component amplitude when said phase offset is late for said shorter run lengths, and
increasing said higher frequency component amplitude when said phase offset is early for said shorter run lengths.

22. The method of claim 19 wherein said step of adjusting said equalization parameter for equalizing said communication channel based on said run length and said phase offset comprises:
adjusting a variable resistance element based on said run length and said phase offset.

23. The method of claim 22 wherein said step of adjusting said equalization parameter for equalizing said communication channel based on said run length and said phase offset further comprises:
adjusting a variable gain element based on said run length and said phase offset.

24. The method of claim 19 wherein said step of adjusting said equalization parameter for equalizing said communication channel based on said run length and said phase offset comprises:
adjusting a variable analog filter based on said run length and said phase offset.

25. The method of claim 19 wherein said step of adjusting said equalization parameter for equalizing said communication channel based on said run length and said phase offset comprises:

adjusting a finite impulse response filter based on said run length and said phase offset.

26. The method of claim 25 wherein said step of adjusting said finite impulse response filter based on said run length and said phase offset comprises:

adjusting a digital finite impulse response filter based on said run length and said phase offset.

27. The method of claim 19 wherein said step of adjusting said equalization parameter for equalizing said communication channel based on said run length and said phase offset comprises:

adjusting a decision feedback equalizer based on run length and said phase offset.

28. The method of claim 27 wherein said step of adjusting said decision feedback equalizer based on run length and said phase offset comprises:

adjusting a digital decision feedback equalizer based on said run length and said phase offset.

29. The method of claim 19 wherein said step of adjusting said equalization parameter for equalizing said communication channel based on said run length and said phase offset comprises:

adjusting a feedforward equalizer based on said run length and said phase offset.

30. The method of claim 29 wherein said step of adjusting said feedforward equalizer based on said run length and said phase offset comprises:

adjusting a digital feedforward equalizer based on said run length and said phase offset.

31. Apparatus for equalizing a communication channel, said apparatus comprising:

a filter circuit coupled to said communication channel for filtering a signal from said communication channel and for providing a filtered signal;

a sampling circuit coupled to said filter circuit for obtaining samples from said filtered signal;

a control circuit for controlling said filter circuit based on said samples wherein said control circuit controls said filter circuit based on a run length of consecutive identical bits determined from center samples and a phase offset determined from edge samples.

32. The apparatus of claim 31 wherein said control circuit provides an amplitude adjustment of said filter circuit over a plurality of frequency ranges.

33. The apparatus of claim 31 wherein said control circuit controls:

a lower frequency amplitude adjustment of said filter circuit, said lower frequency amplitude adjustment affecting a lower frequency amplitude of said filtered signal; and an upper frequency amplitude adjustment of said filter circuit, said upper frequency amplitude adjustment affecting an upper frequency amplitude of said filtered signal.

34. The apparatus of claim 33 wherein said control circuit causes said lower frequency amplitude to be increased when a phase offset is early for a longer run length and to be decreased when a phase offset is late for said longer run length, and wherein said control circuit causes said higher frequency amplitude to be increased when a phase offset is early for a shorter run length and to be decreased when a phase offset is late for a shorter run length.

35. The apparatus of claim 31 wherein said filter circuit comprises:

a variable resistance element having a resistance controlled by said control circuit.

36. The apparatus of claim 35 wherein said filter circuit further comprises:

a variable gain element having a resistance controlled by said control circuit.

37. The apparatus of claim 31 wherein said filter circuit comprises:

finite impulse response filter.

38. The apparatus of claim 37 wherein said finite impulse response filter comprises:

a digital finite impulse response filter.

39. The apparatus of claim 31 wherein said filter circuit comprises:

decision feedback equalizer.

40. The apparatus of claim 39 wherein said decision feedback equalizer comprises:

a digital decision feedback equalizer.

41. The apparatus of claim 31 wherein said filter circuit comprises:

a feedforward equalizer.

42. The apparatus of claim 41 wherein said feedforward equalizer comprises:

a digital feedforward equalizer.

43. A method for equalizing a communication channel comprising:

receiving in a circuit a first bit pattern;

determining a first phase offset of said first pattern;

receiving in said circuit a second bit pattern;

determining a second phase offset of said second bit pattern;

adjusting coefficients of an equalized impulse response of said circuit based on said first phase offset and said second phase offset.

44. The method of claim 43 wherein said step of adjusting said coefficients of said equalized impulse response of said circuit further comprises:

if said first phase offset has a first sign and said second phase offset has said first sign, decreasing a first coefficient of said coefficients and decreasing a second coefficient of said coefficients.

45. The method of claim 44 wherein said step of adjusting said coefficients of said equalized impulse response of said circuit further comprises:

if said first phase offset has a second sign and said second phase offset has said second sign, increasing said first coefficient and increasing said second coefficient.

46. The method of claim 45 further comprising:

receiving in said circuit a third bit pattern;

determining a third phase offset of said third bit pattern;

receiving in said circuit a fourth bit pattern;

determining a fourth phase offset of said fourth bit pattern;

receiving in said circuit a fifth bit pattern;

determining a fifth phase offset of said fifth bit pattern;

receiving in said circuit a sixth bit pattern;

determining a sixth phase offset of said sixth bit pattern; and wherein said step of adjusting said coefficients of said equalized impulse response of said circuit further comprises adjusting said coefficients of said equalized impulse response of said circuit based on said first phase offset, said second phase offset, said third phase offset, said fourth phase offset, said fifth phase offset, and said sixth phase offset.

47. The method of claim 46 wherein said step of adjusting said coefficients of said equalized impulse response of said circuit further comprises:

if said first phase offset has said first sign, said second phase offset has said second sign, said third phase offset has said first sign, said fourth phase offset has said first sign, said fifth phase offset has said first sign, and said sixth phase offset has said first sign, decreasing said first coefficient and decreasing said second coefficient;

if said first phase offset has said first sign, said second phase offset has said second sign, said third phase offset has said first sign, and one of a first group, said first group comprising said fourth phase offset, said fifth phase offset, and said sixth phase offset, has said second sign, decreasing said first coefficient and decreasing said second coefficient, wherein said first coefficient is decreased more than said second coefficient;

if said first phase offset has said first sign, said second phase offset has said second sign, said sixth phase offset has said first sign, and one of a second group, said second group comprising said third phase offset, said fourth phase offset, and said fifth phase offset, has said second sign, decreasing said first coefficient and decreasing said second coefficient, wherein said second coefficient is decreased more than said first coefficient;

if said first phase offset has said first sign, said second phase offset has said second sign, said third phase offset has said second sign, said fourth phase offset has said second sign, said fifth phase offset has said second sign, and said sixth phase offset has said second sign, decreasing said first coefficient and decreasing said second coefficient.

48. The method of claim 47 wherein said step of adjusting said coefficients of said equalized impulse response of said circuit further comprises:

if said first phase offset has said second sign, said second phase offset has said first sign, said third phase offset has said first sign, said fourth phase offset has said first sign, said fifth phase offset has said first sign, and said sixth phase offset has said first sign, increasing said first coefficient and increasing said second coefficient;

if said first phase offset has said second sign, said second phase offset has said first sign, said third phase offset has said second sign, and one of said first group has said first sign, increasing said first coefficient and increasing said second coefficient, wherein said first coefficient is increased more than said second coefficient;

if said first phase offset has said second sign, said second phase offset has said first sign, said sixth phase offset has said second sign, and one of said second group has said first sign, decreasing said first coefficient and decreasing said second coefficient, wherein said second coefficient is increased more than said first coefficient;

if said first phase offset has said second sign, said second phase offset has said first sign, said third phase offset has said second sign, said fourth phase offset has said second sign, said fifth phase offset has said second sign, and said sixth phase offset has said second sign, increasing said first coefficient and increasing said second coefficient.

49. A method for equalizing a communication channel comprising:

receiving in a circuit a first bit pattern;
determining a first phase offset of said first pattern;
receiving in said circuit a second bit pattern;
determining a second phase offset of said second bit pattern;
adjusting coefficients of an equalized impulse response of said circuit based on said first phase offset and said second phase offset wherein if said first phase offset has a first sign and said second phase offset has said first sign, decreasing a first coefficient of said coefficients and decreasing a second coefficient of said coefficients.

50. The method of claim 49 wherein said step of adjusting said coefficients of said equalized impulse response of said circuit further comprises:

if said first phase offset has a second sign and said second phase offset has said second sign, increasing said first coefficient and increasing said second coefficient.

51. The method of claim 50 further comprising:

receiving in said circuit a third bit pattern;
determining a third phase offset of said third bit pattern;
receiving in said circuit a fourth bit pattern;
determining a fourth phase offset of said fourth bit pattern;
receiving in said circuit a fifth bit pattern;
determining a fifth phase offset of said fifth bit pattern;
receiving in said circuit a sixth bit pattern;
determining a sixth phase offset of said sixth bit pattern; and
wherein said step of adjusting said coefficients of said equalized impulse response of said circuit further comprises adjusting said coefficients of said equalized impulse response of said circuit based on said first phase offset, said second phase offset, said third phase offset, said fourth phase offset, said fifth phase offset, and said sixth phase offset.

52. The method of claim 51 wherein said step of adjusting said coefficients of said equalized impulse response of said circuit further comprises:

if said first phase offset has said first sign, said second phase offset has said second sign, said third phase offset has said first sign, said fourth phase offset has said first sign, said fifth phase offset has said first sign, and said sixth phase offset has said first sign, decreasing said first coefficient and decreasing said second coefficient;

if said first phase offset has said first sign, said second phase offset has said second sign, said third phase offset has said first sign, and one of a first group, said first group comprising said fourth phase offset, said fifth phase offset, and said sixth phase offset, has said second sign, decreasing said first coefficient and decreasing said second coefficient, wherein said first coefficient is decreased more than said second coefficient;

if said first phase offset has said first sign, said second phase offset has said second sign, said sixth phrase offset has said first sign, and one of a second group, said second group comprising said third phase offset, said fourth phase offset, and said fifth phase offset, has said second sign, decreasing said first coefficient and decreasing said second coefficient, wherein said second coefficient is decreased more than said first coefficient;

if said first phase offset has said first sign, said second phase offset has said second sign, said third phase offset has said second sign, said fourth phase offset has said second sign, said fifth phase offset has said second sign, and said sixth phase offset has said second sign, decreasing said first coefficient and decreasing said second coefficient.

53. The method of claim 52 wherein said step of adjusting said coefficients of said equalized impulse response of said circuit further comprises:

if said first phase offset has said second sign, said second phase offset has said first sign, said third phase offset has said first sign, said fourth phase offset has said first sign, said fifth phase offset has said first sign, and said sixth phase offset has said first sign, increasing said first coefficient and increasing said second coefficient;

if said first phase offset has said second sign, said second phase offset has said first sign, said third phase offset has said second sign, and one of said first group has said first sign, increasing said first coefficient and increasing said second coefficient, wherein said first coefficient is increased more than said second coefficient;

if said first phase offset has said second sign, said second phase offset has said first sign, said sixth phase offset has said second sign, and one of said second group has said first sign, decreasing said first coefficient and decreasing said second coefficient, wherein said second coefficient is increased more than said first coefficient;

if said first phase offset has said second sign, said second phase offset has said first sign, said third phase offset has said second sign, said fourth phase offset has said second sign, said fifth phase offset has said second sign, and said sixth phase offset has said second sign, increasing said first coefficient and increasing said second coefficient.

* * * * *